April 8, 1958     B. A. SWENNES     2,829,542
TRANSMISSION
Filed Sept. 20, 1954
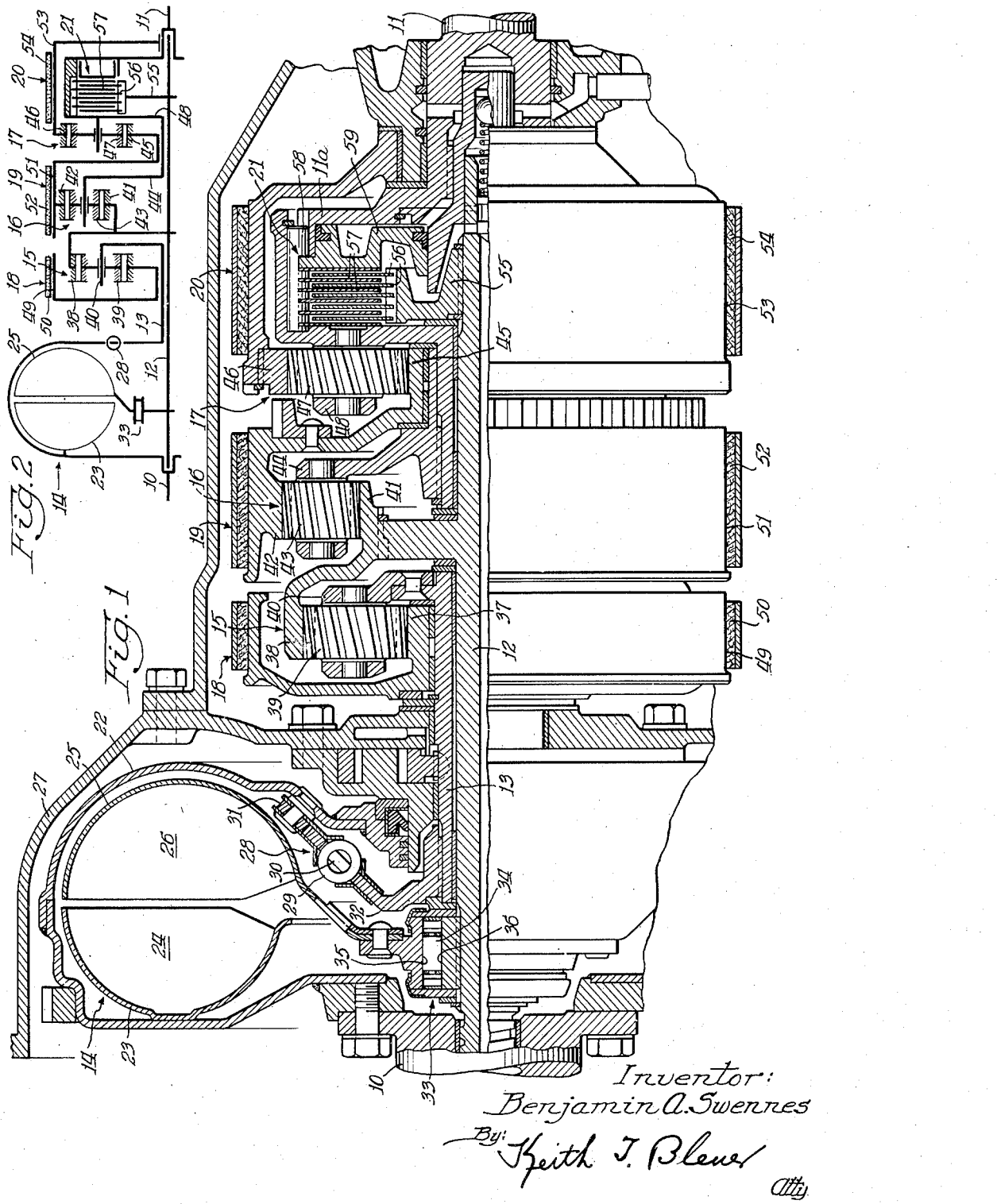
Inventor:
Benjamin A. Swennes
By: Keith J. Blewer
Atty.

United States Patent Office 2,829,542
Patented Apr. 8, 1958

2,829,542

TRANSMISSION

Benjamin A. Swennes, Kalamazoo, Mich., assignor to Borg-Warner Corporation, Chicago, Ill., a corporation of Illinois Application September 20, 1954, Serial No. 456,951

5 Claims. (Cl. 74—688)

My invention relates to transmissions and more particularly to transmissions for automotive vehicles.

It is an object of the present invention to provide an improved transmission comprising a hydrodynamic coupling device through which a low speed power train and a direct drive power train are completed with the transmission also providing an intermediate speed power train and an overdrive power train exclusive of the hydrodynamic device.

It is another object of the invention to provide an improved transmission comprising a pair of gear sets, one of the gear sets providing reduced and direct drive between an intermediate shaft and the transmission driven shaft, and a fluid coupling and an overdrive planetary gear set connected in parallel between the drive and intermediate shafts so that either can drive the intermediate shaft.

The invention consists of the novel constructions, arrangements and devices to be hereinafter described and claimed for carrying out the above-stated objects and such other objects as will appear from the following description of a preferred form of the invention illustrated with reference to the accompanying drawings wherein:

Fig. 1 is a longitudinal sectional view of a transmission embodying the principles of the invention; and Fig. 2 is a schematic illustration of the transmission shown in Fig. 1.

Like characters of reference designate like parts in the several views.

Referring now to the drawings, the illustrated transmission, which is particularly adapted for use in an automobile, comprises a drive shaft 10, a driven shaft 11, an intermediate shaft 12 coaxially disposed with respect to the shafts 10 and 11 and a quill shaft 13 rotatably disposed on the shaft 12. The shaft 10 is adapted to be driven by the engine of the vehicle in which the transmission is installed and the shaft 11 is adapted to drive the road wheels of the vehicle through any suitable connections (not shown). The transmission comprises in general a fluid coupling 14, planetary gear sets 15, 16 and 17, friction brakes 18, 19 and 20 and a friction clutch 21.

The fluid coupling 14 comprises a fluid housing 22 carrying within it an impeller 23 having blades 24 fixed therein and a runner or driven element 25 having blades 26 fixed therein. The housing 22 is provided with the usual seals with the transmission casing 27 for making the housing 22 fluid tight.

The housing 22 is connected by means of a spring dampener assembly 28 with the quill shaft 13. The dampener assembly 28 may be of any suitable well-known form and may comprise a plurality of springs 29 disposed and held in windows 30 provided in parts 31 and 32 respectively fixed with respect to the housing 22 and splined on to the quill shaft 13.

The runner 25 is connected by means of a one-way clutch 33 with the intermediate shaft 12. The one-way clutch 33 may be of any suitable type and may comprise tiltable sprags 34 adapted to wedge between opposed cylindrical race surfaces 35 and 36. The sprags are so disposed within the cylindrical races 35 and 36 that the one-way clutch 33 transmits torque from the runner 25 to the shaft 12 in the forward direction, that is, in the same direction the shaft 10 is driven from the engine of the vehicle.

The planetary gear set 15 comprises a sun gear 37, a ring gear 38, a plurality of planet gears 39 in mesh with the sun and ring gears and a carrier 40 for the planet gears. The planetary gear set 16 comprises a sun gear 41, a ring gear 42, a plurality of planet gears 43 in mesh with the sun and ring gears 41 and 42 and a carrier 44 for the planet gears. The planetary gear set 17 comprises a sun gear 45, a ring gear 46, a plurality of planet gears 47 in mesh with the sun and ring gears 45 and 46 and a carrier 48 for the planet gears 47.

The ring gear 38 and the sun gear 41 are formed from an integral piece which is splined to the intermediate shaft 12. The planet gear carrier 40 is fixed to the quill shaft 13. The sun gear 37 is rotatably disposed on the quill shaft 13 and is controlled by the brake 18. The brake 18 comprises a drum 49 integrally formed with the sun gear 37 and a brake band 50 adapted to be contracted on the drum 49 for thereby holding the drum 49 stationary.

The carrier 44 of the second planetary gear set 16 is splined on to the carrier 48 of the third planetary gear set 17 which is rotatably disposed on the intermediate shaft 12. The ring gear 42 of the gear set 16 is formed integrally with respect to the sun gear 45 of the gear set 17 which is rotatably disposed on the carrier 44.

The brake 19 is effective on the ring gear 42 and the sun gear 45 and comprises a cylindrical drum surface 51 and a brake band 52 adapted to be contracted into braking engagement on the surface 51.

The carrier 48 of the gear set 17 is connected with the driven shaft 11 thereby also connecting the carrier 44 with the shaft 11. The ring gear 46 is carried by a drum portion 53 rotatably disposed with respect to the transmission casing 27. The brake 20 is effective on the ring gear 46 and comprises a brake band 54 adapted to be contracted to grip the drum portion 53.

The clutch 21 comprises a hub 55 splined on the intermediate shaft 12 and carrying a plurality of clutch disks 56. Clutch disks 57 are disposed between the disks 56 and are slidably disposed on pins 58 which also function to fix the carrier 48 with respect to an annular disk shaped portion 11a of the shaft 11. A piston 59 is slidably disposed in an annular cavity formed in the shaft portion 11a and functions to compress the plates 57 and 56 into frictional interengagement between the piston and an opposing surface of the carrier 48 for engaging the clutch 21.

The transmission provides first and second underdrive speed ratios, a direct drive and an overdrive, in addition to a reverse drive. The first or lowest speed ratio, which is an underdrive, is obtained by engaging the brake 19. In this case the drive is from the shaft 10, through the impeller 23, the runner 25, the one-way clutch 33, the shaft 12, the sun gear 41, the planet gears 43 and the carrier 44 which is connected through the carrier 48 to the driven shaft 11. The brake 19 fixed against rotation with respect to the transmission casing 27, having its band 52 engaged on the drum surface 51, takes the reaction for this drive. In this drive, it will be observed that all of the power from the drive shaft 10 flows through the fluid coupling 14 and the one-way clutch 33.

Second speed drive, which is also an underdrive, is completed by engaging the brake 18, allowing the brake 19 to remain engaged. The drive in this case is from the drive shaft 10 through the fluid coupling housing 22, the spring dampener 28, the quill shaft 13, the carrier 40, the planet gears 39 and the ring gear 38 to the sun gear 41 from which the drive to the driven shaft 11 remains the same as in low speed drive. The gear set 15 in this case functions as an overdriving gear set, driving the ring gear 38 at a faster speed than the carrier 40, and subsequent reduction in speed by the gear set 16 is greater than the overdriving effect by the gear set 15 so that the overall speed ratio between the shafts 10 and 11 is an underdrive. For this drive, the brake 18, comprising the band 50 now engaged on the drum 49, takes the reaction to the transmission casing 27 for the gear set 15, and the brake 19 continues to take the reaction to the casing 27 for the gear set 16. Since the sun gear 41 is driven at a faster speed than in low speed drive, the one-way clutch 33 in this case overruns so that there is no drive from the runner 25 of the fluid coupling.

Third speed ratio or direct drive is subsequently obtained by engaging the friction clutch 21 and disengaging the brakes 18 and 19. The drive in this case is from the drive shaft 10, through the fluid coupling 14, the intermediate shaft 12, the clutch hub 55, the clutch plates 56 and 57 to the shaft 11. Since the carriers 44 and 48 are connected together, and the ring gear 42 and the sun gear 45 are connected together and the plates 57 are connected with respect to the carriers and the plates 56 are connected through the shaft 12 with the sun gear 41, the parts of the gear sets 16 and 17 which actually function as a single gear set, are locked up and rotate as a unit when the clutch 21 is engaged.

The fourth speed ratio or overdrive is subsequently obtained by engaging the brake 18, allowing the clutch 21 to remain engaged. The drive in this case is from the drive shaft 10, through the fluid coupling housing 22, the dampener 28, the quill shaft 13, the carrier 40, the planet gears 39, the ring gear 38, the intermediate shaft 12 and the clutch 21 to the driven shaft 11. The planetary gear set 15 in this case functions, as in second speed drive, to provide an overdrive of its ring gear 38 and thereby of the shaft 12 connected therewith so that the one-way clutch 33 overruns and the fluid coupling impeller 23 and the runner 25 transmit no torque.

Reverse drive is obtained by engaging the brake 20. The drive in this case is from the drive shaft 10 through the fluid coupling 14, the one-way clutch 33, the shaft 12, the sun gear 41, and the planet gear sets 16 and 17 to the driven shaft 11. The ring gear 42 and sun gear 45 are tied together, and the carriers 44 and 48 are tied also, and thus a driving of the sun gear 41, holding the ring gear 46 against rotation, provides a reverse drive of the carriers 44 and 48 and thereby of the driven shaft 11 connected therewith.

It will be noted that the first or low speed ratio includes the fluid coupling 14 through which all of the power is transmitted. The vehicle may thus be gradually started simply by moving the vehicle accelerator toward an open throttle position to increase the speed of the vehicle engine above idling, so that the fluid coupling acts as a slipping clutch to gradually complete the low speed power train. The second speed power train, as contrasted to the first speed power train, is completely mechanical, that is, none of the power is transmitted through the fluid coupling. This power train thus is very useful for utilizing the vehicle engine as a brake, as when driving down hills or mountains, and this power train is also useful for parking.

The power in third speed or direct drive is through the fluid coupling, and this gear is particularly useful for city driving, advantageously giving substantial acceleration to the vehicle and yet permitting some slip in the fluid coupling for low vehicle speeds. The fourth speed ratio or overdrive provides a maximum of economy of operation and in this case, as in second speed ratio, all of the power through the transmission is mechanically transmitted.

I wish it to be understood that my invention is not to be limited to the specific constructions and arrangements shown and described, except only insofar as the claims may be so limited, as it will be understood to those skilled in the art that changes may be made without departing from the principles of the invention.

I claim:

1. In a transmission, the combination of a drive shaft, a driven shaft, an intermediate shaft, a planetary gear set for driving said driven shaft at a reduced speed with respect to said intermediate shaft, said gear set including sun and ring and planet gears and a planet carrier, said sun gear being connected with said intermediate shaft and said carrier being connected with said driven shaft, a friction brake for said ring gear for completing the reduced speed drive through said gear set, a friction clutch for locking together two elements of said gear set for providing a direct drive from said intermediate to said driven shaft, a hydrodynamic coupling device driven by said drive shaft, a one-way clutch between said hydrodynamic device and said intermediate shaft for completing a power train from said drive shaft to the intermediate shaft through said hydrodynamic device, an overdriving gear set for driving said intermediate shaft at a higher speed ratio than that completed by said hydrodynamic device, said overdriving gear set comprising sun and ring and planet gears and a planet gear carrier, said last-named carrier being connected with said drive shaft and said last-named ring gear being connected with said intermediate shaft, and a friction brake for said last-named sun gear for completing said overdriving power train through said last-named gear set.

2. In a transmission, the combination of a drive shaft, a driven shaft, an intermediate shaft, a planetary gear set for driving said driven shaft at a reduced speed with respect to said intermediate shaft, said gear set including sun and ring and planet gears and a planet carrier, said sun gear being connected with said intermediate shaft and said carrier being connected with said driven shaft, means for braking said ring gear for completing the reduced speed drive through said gear set, clutch means for locking together two elements of said gear set for providing a direct drive from said intermediate to said driven shaft, a hydrodynamic coupling device driven by said drive shaft, means connecting said hydrodynamic device and said intermediate shaft for completing a power train from said drive shaft to the intermediate shaft through said hydrodynamic device, an overdriving gear set for driving said intermediate shaft at a higher speed ratio than that completed by said hydrodynamic device, said overdriving gear set comprising sun and ring and planet gears and a planet gear carrier, said last-named carrier being connected with said drive shaft and said last-named ring gear being connected with said intermediate shaft and braking means for said last-named sun gear for completing said overdriving power train through said last-named gear set.

3. In a transmission, the combination of a drive shaft, a driven shaft, an intermediate shaft, a planetary gear set for driving said driven shaft at a reduced speed with respect to said intermediate shaft, said gear set including sun and ring and planet gears and a planet carrier, said sun gear being connected with said intermediate shaft and said carrier being connected with said driven shaft, means for braking said ring gear for completing said reduced speed drive through said gear set, clutch means for locking together two elements of said gear set for providing a direct drive from said intermediate to said driven shaft, means connecting said intermediate shaft to said drive shaft for completing a power train from said drive shaft to the intermediate shaft, an overdriving gear set for driving said intermediate shaft at a higher speed ratio than that completed by said connecting means, said overdriving gear set comprising sun and ring and planet gears and a planet gear carrier, said last-named carrier being connected with said drive shaft and said last-named ring gear being connected with said intermediate shaft and brake means for said last-named sun gear for completing said overdriving power train through said last-named gear set.

4. In a transmission, the combination of a drive shaft, a driven shaft, an intermediate shaft, a gear set for connecting said intermediate and driven shafts to drive the latter at a reduced speed, a hydrodynamic coupling device driven by said drive shaft, a one-way clutch connecting said intermediate shaft and said hydrodynamic coupling device for driving the intermediate shaft through the hydrodynamic device for thereby driving said driven shaft through said gear set, and an overdriving gear set for driving said intermediate shaft at a higher speed ratio than that completed by said hydrodynamic device, said overdriving gear set comprising sun and ring and planet gears and a planet gear carrier, said last-named carrier being connected with said drive shaft and said last-named ring gear being connected with said intermediate shaft, and braking means for said last-named sun gear for completing the overdriving power train through said last-named gear set.

5. In a transmission, the combination of a drive shaft, a driven shaft, an intermediate shaft, a planetary gear set for driving said driven shaft at a reduced speed from said intermediate shaft and including a brake means for an element of the gear set for completing the drive between the intermediate and driven shafts, clutch means for locking up the elements of said gear set for providing an alternative direct drive between said intermediate shaft and said driven shaft, a hydrodynamic coupling device driven by said drive shaft, a one-way clutch for connecting said hydrodynamic device and said intermediate shaft for driving the latter through the hydrodynamic device, and an overdriving gear set for driving said intermediate shaft at a higher speed ratio than that completed by said hydrodynamic device, said overdriving gear set comprising sun and ring and planet gears and a planet gear carrier, said last-named carrier being connected with said drive shaft and last-named ring gear being connected with said intermediate shaft and brake means for said last-named sun gear for completing said overdriving power train through said last-named gear set.

References Cited in the file of this patent
UNITED STATES PATENTS

| | | |
|---|---|---|
| 2,324,733 | Smirl | July 20, 1943 |
| 2,418,378 | Voytech | Apr. 1, 1947 |
| 2,749,775 | Simpson | June 12, 1956 |